Figure 3:
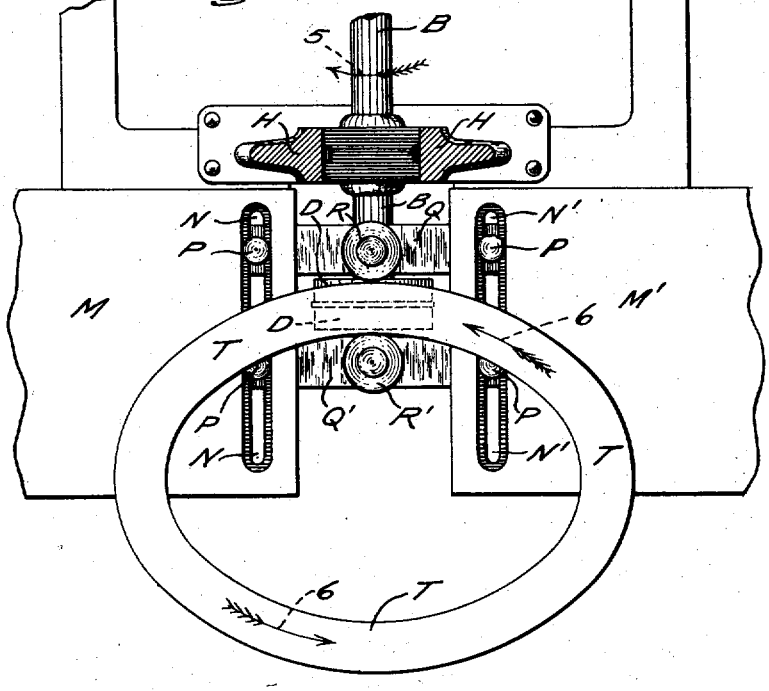

No. 11,940.
Reissued Oct. 22, 1901.
F. E. ADAMS.
MACHINE FOR MOUNTING ORNAMENTAL COMPOSITION DIRECTLY UPON CIRCULAR PICTURE FRAMES.
(Application filed Aug. 2, 1901.)
2 Sheets—Sheet 1.
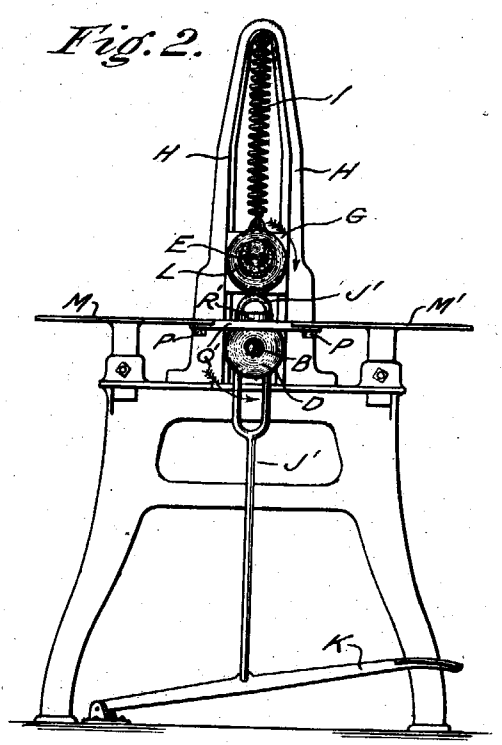
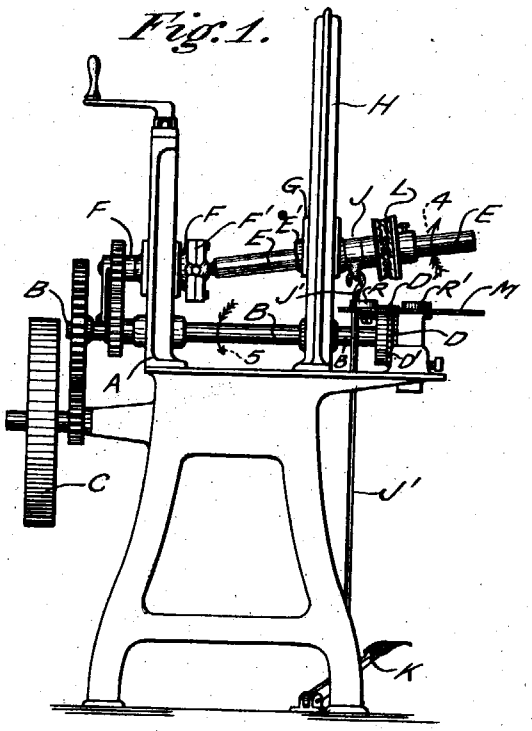
WITNESSES:
Geo. H. Thomas
Glen C. Stephens
INVENTOR:
Frank E. Adams
BY
Rummler & Rummler,
his ATTORNEYS.
THE NORRIS PETERS CO., PHOTO-LITHO., WASHINGTON, D. C.

No. 11,940. Reissued Oct. 22, 1901.

F. E. ADAMS.

MACHINE FOR MOUNTING ORNAMENTAL COMPOSITION DIRECTLY UPON CIRCULAR PICTURE FRAMES.

(Application filed Aug. 2, 1901.)

2 Sheets—Sheet 2.

WITNESSES:

Geo. J. Amiston

Glen C. Stephens

INVENTOR:

Frank E. Adams

BY

Rummler & Rummler his ATTORNEYS.

THE NORRIS PETERS CO., PHOTO-LITHO., WASHINGTON, D. C.

UNITED STATES PATENT OFFICE.

FRANK E. ADAMS, OF CHICAGO, ILLINOIS, ASSIGNOR TO SAMUEL FRANKLIN, OF CHICAGO, ILLINOIS.

MACHINE FOR MOUNTING ORNAMENTAL COMPOSITION DIRECTLY UPON CIRCULAR PICTURE-FRAMES.

SPECIFICATION forming part of Reissued Letters Patent No. 11,940, dated October 22, 1901.

Original No. 642,059, dated January 30, 1900. Application for reissue filed August 2, 1901. Serial No. 70,678.

*To all whom it may concern:*

Be it known that I, FRANK E. ADAMS, a citizen of the United States, residing at Chicago, in the county of Cook and State of Illinois, have invented certain new and useful Improvements in Machines for Mounting Ornamental Composition Directly Upon Circular Picture-Frames, of which the following is a specification.

My invention relates to means for mounting and molding composition for ornamenting picture-frames or the stock from which picture-frames are manufactured; and my object is a construction particularly adapted to use on picture-frames having an annular, ovate, or irregular form, upon which heretofore the composition has been usually mounted by hand instead of direct, as in my machine, the same being fully described hereinafter, and illustrated in the accompanying drawings, in which—

Figure 1 is a left side elevation, and Fig. 2 a front side elevation, showing the operative parts in the open position ready to receive a picture-frame to be ornamented. Fig. 3 is a plan, on an enlarged scale, of a portion of the table and front of the frame of the machine, together with the operative parts adapted to move and guide the picture-frame, which latter is shown in position ready to be ornamented.

Similar letters indicate like parts throughout the several views.

In the frame A of the machine is mounted a horizontal shaft B, which is connected by several cog-wheels with a pulley C, to which power is applied. Shaft B at the front end has firmly mounted thereon a cylindrical roller D, having a series of fine teeth projecting from the periphery, as at D′. At E is a shaft mounted to revolve above shaft B, and in order that it may be raised and lowered relative to shaft B has one end connected to a short shaft F by means of the ordinary ball-swivel coupling, as shown at F′. Short shaft F is geared by a series of four cog-wheels, forming an ordinary expanding gear, with shaft B, so that shaft F may be raised and lowered relative to shaft B yet always remain in gear therewith. The front end portion of shaft E is mounted in a swivel-box E′, which latter is mounted in the sides of a cross-head G, which is fitted to slide in the slotted central portion of the vertical frame H. A strong helical spring I is attached at the top end to frame H and the bottom end to cross-head G and is of sufficient size to yieldingly suspend the cross-head G and all the parts connected therewith. At J is a collar loosely mounted on shaft E and is connected by a rod J′ to a foot-lever K. On the outer projecting end portion of shaft E is firmly secured a roller L, whose peripheral surface is provided with an ornamental design in relief, as is usual in molding-machines adapted to applying composition to be molded into ornamental forms on straight strips suited to the manufacture of square picture-frames.

In Fig. 3 the tables M and M′ are shown with transverse slots N and N′, in which are bolts P, which adjustably secure cross-pieces Q and Q′ to the tables. The top of each table is preferably recessed around the slot into which the head of the bolt is countersunk, so that it will not project above the surface of the table. Each end of each cross-piece is preferably halved or recessed, so as to fit under the table and be clamped in position by the nut upon the bolt, while the upper surface is even with the tops of the tables. By making the adjacent edges of the tables and the slots parallel with each other and having the recessed ends of the cross-pieces fit squarely against the edges the cross-pieces are always held at right angles to the slots and the guides are in their proper places. Mounted on each cross-piece is a guide or stop in the form of a pivotally-mounted roller, such as R and R′, adapted to revolve in a horizontal plane or in a plane substantially at a right angle to the plane of revolution of large roller D and which serve to limit the lateral movement of the picture-frame T. The guides R and R′ are usually mounted substantially in line with the longitudinal center line of shaft B and are disposed in a plane extending along and through the axes of both of the shafts B and E.

The cross-pieces Q and Q′ are made adjustable toward and from each other, so that the guides R and R′ may be separated a suitable distance to receive the picture-frame, such adjustment being suitable to keep the points of contact with the picture-frame of the guides R and R′ and the rolls D and L in the vertical plane extending along and through the axes of the shafts B and E. The cross-piece Q′ is so mounted as to be movable away from the roll D a sufficient distance to permit its replacement by another roll of different size.

In mounting narrow picture-frames a narrow feed-roll D is used, and the guides R and R′ are adjusted so as to bear against said picture-frame. In mounting a wide picture-frame a feed-roll D of about the same width as the frame will be substituted, so as to give a broad support to the picture-frame under the part which is being acted upon by the impression-roll. This is particularly serviceable in case a picture-frame of thin material is being mounted, since if a feed-roll were used in such case which is narrower than the picture-frame the impression is likely to be imperfect along the edge of such frame projecting over the side of the feed-roll. Even in case the stock of the picture-frame is quite heavy the broad feed-roll will avoid any tilting of the frame toward the side receiving the impression, and will thus insure uniformity in the composition being mounted upon the frame.

The teeth of the feed-roller D are preferably located substantially midway between the guides R and R′ and project far enough above the top of the table to form a feed-rack, which moves at right angles to a line drawn between the two guides and forces the portion of the frame between them forward in a straight line. The curvature of the projecting portion of the feed-wheel will cause the teeth upon each side of a line drawn between the two guides to engage with the frame to such a slight extent that the portions of the frame upon each side of said line can move in a slight curve, thereby enabling the machine to properly feed frames having irregular outlines or those having very short turns or curves. By locating the guides just far enough apart to permit the sides of the frame to pass they will assist in guiding the frame by the slight frictional contact caused thereby.

It will be understood that the guides or stops R and R′ may be made stationary and with rounded faces in contact with the stock instead of rollers, for the reason that these parts serve simply to hold the picture-frame in position, yet not permitting it to rotate in such an irregular manner or with so many or such widely-variable centers of movement in a horizontal plane upon the table that the composition would be laid with such great irregularity as to ruin the work. A guide or stop only at one side edge, either at the inside or the outside, of an irregular or even an ordinary long oval picture-frame would not be sufficient to serve as a guide even in the hands of a skilled workman. The two guides R and R′ and the rollers D and L all having contact with the picture-frame at different points in a plane extending through and along the axes of said rolls prevents any lateral shifting of said picture-frame at the point immediately receiving the impression.

To operate this machine, rollers D and L are separated by the resiliency of spring I to the position shown in Figs. 1 and 2, when the oval frame T may be placed in the position shown in Fig. 3, with the lower face in contact with the lower roller and in engagement with the teeth D′ thereon, the side edges of the frame being held laterally or limited in lateral movement by the guides R and R′. If now roller L is pulled down, so that the impression-face thereof is in contact with the top of the picture-frame, by pressing on foot-lever K and then the rollers L and D started in revolution in the direction indicated by arrows 4 and 5 the frame will be revolved in the direction indicated by arrow 6, when, if the soft composition to be molded is fed between the top roller L and the surface of the picture-frame, it will be firmly pressed into position and the ornaments formed direct upon the frame in a manner similar to what is done when molding ordinary straight material.

It is intended to use the ordinary substantially cylindrical ornamenting-rollers and substantially cylindrical feed-rolls adapted to use in the machines for covering straight molding with ornamental composition.

It is obvious that the outer surface of an annular frame in revolution travels a greater distance than the surface at the inner edges thereof and that, seemingly, conical rollers could be used to some advantage; but since the putty or composition with which the frames are covered is of a yielding or plastic nature it is mounted on the frames in practice in a satisfactory manner with the feed and ornamenting rollers both substantially cylindrical, as shown.

It will be understood that numerous details of the construction shown may be altered without departing from the spirit of my invention. I therefore do not confine myself to such details, except as hereinafter limited in the claims.

What I claim as my invention, and desire to secure by Letters Patent, is—

1. In a machine for directly mounting ornamental composition on frames, the combination, with a support provided with an impression-roller and means for operating the same, of two tables on the support, each of which is provided with a slot, two bolts in each slot, two cross-pieces between the tables, the ends of which extend under the slots and engage with the bolts, a guide projecting from the central portion of each cross-piece above the tops of the tables, and a wheel journaled between the tables and the cross-pieces, the axis of which is substantially in alinement with the guides and the periphery is provided with teeth and projects above the tops of the tables.

2. In a machine for directly mounting ornamental composition on frames, the combination, with a support provided with an impression-roller and means for operating the same, of two tables on the support, the adjacent edges of which are parallel, each table being provided with a slot, parallel with its edge and having a portion of its top around the slot cut away, two cross-pieces between the tables, each end of each of which is halved and extends under the table and the top fits squarely between the tables and is even with the tops thereof, a bolt through each end of each cross-piece, the head of which fits within the recessed portion of the table and the nut clamps the cross-piece against the under side of the table, a roller journaled at the central portion of each cross-piece so as to project above the tops of the tables, and a roller journaled between the tables and the cross-pieces, the axis of which is substantially in alinement with the rollers on the cross-pieces and the periphery projects above the tops of the tables and is provided with teeth.

3. In a machine of the class described, the combination of a supporting-frame, a feed-roll journaled therein upon a horizontally-disposed axis, an impression-roll disposed above said feed-roll and journaled in said frame in a vertically-movable bearing, a guide located upon each side of the feed-roll at its upper part and both of said guides being located in a vertical plane extending through and parallel with the axes of both of said rolls, said feed-roll being removable toward one side and the guide on said side being movably mounted to permit the removal of said feed-roll.

4. In a machine of the class described, the combination of a supporting-frame, a horizontally-disposed rotary shaft journaled therein and having a free end projecting beyond its bearing, a removable feed-roll mounted on said free end, a second rotary shaft journaled above the other shaft in a vertically-movable bearing and having a free end projecting beyond its bearing, an impression-roll adapted to coact with said feed-roll and removably mounted upon the free end of said second shaft, a guide located on each side of said feed-roll at its upper part and both of said guides being in a vertical plane extending through and parallel with the axes of both of said shafts, a movable member secured to said frame and supporting the guide on the outside of said feed-roll in suitable manner to permit the removal of the feed-roll toward the free end of its shaft.

5. In a machine of the class described, the combination of a supporting-frame, a feed-roll journaled therein upon a horizontally-disposed axis, an impression-roll disposed above said feed-roll and journaled in said frame in a vertically-movable bearing, a guide located upon each side of the feed-roll at its upper part and both of said guides being located in a vertical plane extending through and parallel with the axes of both of said rolls, and each being adjustable toward and from each other, said feed-roll being removable toward one side and the guide on said side being movably mounted to permit the removal of said feed-roll.

6. In a machine of the class described, the combination of a supporting-frame, a feed-roll journaled therein upon a horizontally-disposed axis, an impression-roll disposed above said feed-roll and journaled in said frame in a vertically-movable bearing, a guide located upon each side of the feed-roll at its upper part, and both of said guides being located in a vertical plane extending through and parallel with the axes of both of said rolls, a platform having a recess through which the upper face of said feed-roll projects, cross-pieces adjustably mounted upon opposite sides of said recess and each supporting one of said guides.

7. In a machine of the class described, the combination of a supporting-frame, a feed-roll journaled therein, an impression-roll journaled in said frame in movable bearings, said impression-roll having its face opposed to and adapted to coact with the face of the feed-roll upon an interposed picture-frame, and a pair of guides mounted on said supporting-frame and adapted to have contact with opposite sides of said picture-frame at points located in a plane extending through and parallel with the axes of both of said rolls.

8. In a machine of the class described, the combination of a supporting-frame, a feed-roll journaled therein, an impression-roll journaled in said frame in movable bearings, said impression-roll having its face opposed to and adapted to coact with the face of the feed-roll upon an interposed picture-frame, and a pair of guides mounted on said supporting-frame and adapted to have contact with opposite sides of said picture-frame at points located in a plane extending through and parallel with the axes of both of said rolls; one of said guides being adjustable in said plane toward and from the other guide.

9. In a machine of the class described, the combination of a supporting-frame, a feed-roll journaled therein, an impression-roll journaled in said frame in movable bearings, said impression-roll having its face opposed to and adapted to coact with the face of the feed-roll upon an interposed picture-frame, and a pair of guides mounted on said supporting-frame and adapted to have contact with opposite sides of said picture-frame at points located in a plane extending through and parallel with the axes of both of said rolls; both of said guides being adjustable in said plane toward and from each other.

10. In a machine of the class described, the combination of a supporting-frame, a feed-roll journaled therein, an impression-roll journaled in said frame in movable bearings, said impression-roll having its face opposed to and adapted to coact with the face of the feed-roll upon an interposed picture-frame, and a pair of guides mounted on said supporting-frame and adapted to have contact with opposite sides of said picture-frame at points located in a plane extending through and parallel with the axes of both of said rolls; said rolls being removably mounted and one of said guides being movably mounted to permit the removal of said feed-roll in the direction of such guide.

Signed at Chicago this 20th day of June, 1901.

FRANK E. ADAMS.

Witnesses:
WM. R. RUMMLER,
GLEN C. STEPHENS.